Patented Jan. 8, 1935

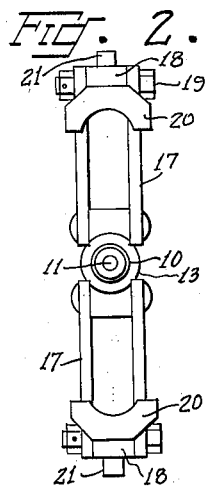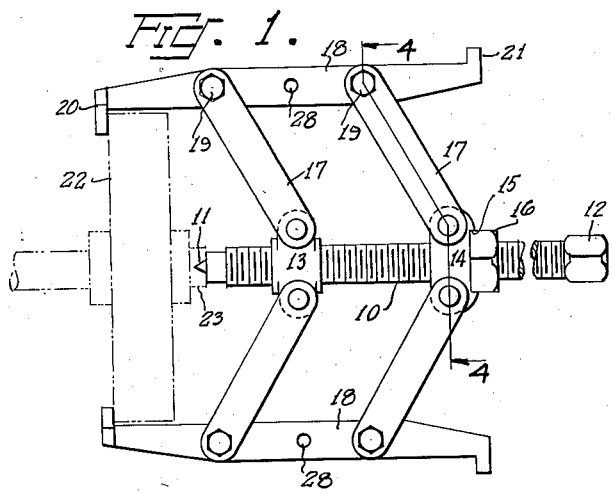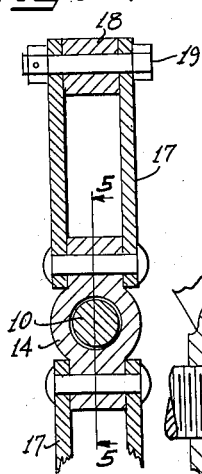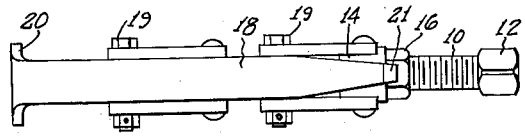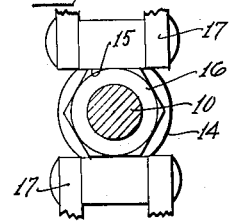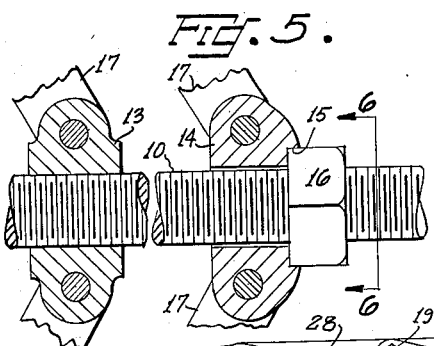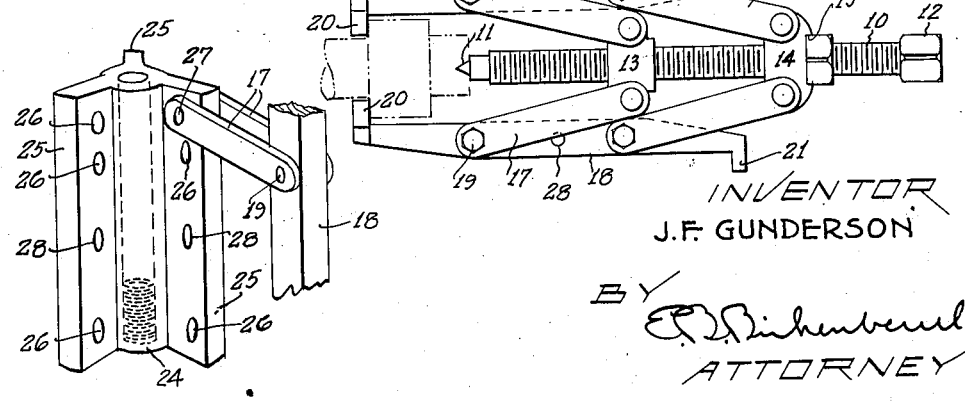

1,987,008

UNITED STATES PATENT OFFICE 1,987,008

GEAR PULLER

Joseph F. Gunderson, Portland, Oreg.

Application August 8, 1933, Serial No. 684,186

1 Claim. (Cl. 29—85)

This invention relates generally to automotive tools, and particularly to a gear puller.

The main object of this invention is to provide a gear puller which will always pull true to the back face of the gear regardless of its size or shape.

The second object is to provide a compound leverage by means of which the force of the blow is directed against the shaft in one direction and against the gear in the opposite direction.

The third object is to so construct the device that the angularity of the gripping jaws may be varied to suit the requirements of the individual case.

These, and other objects, will become more apparent from the specification following as illustrated in the accompanying drawing, in which:

Fig. 1 is a side elevation of the device.

Fig. 2 is a front elevation of same.

Fig. 3 is an end elevation.

Fig. 4 is a section taken along the line 4—4 in Fig. 1.

Fig. 5 is a fragmentary section taken along the line 5—5 in Fig. 4.

Fig. 6 is a section taken along the line 6—6 in Fig. 5.

Fig. 7 is a view similar to Fig. 1 but showing the parts in position at the commencement of a pulling operation.

Fig. 8 is a perspective view showing a modified form of nut.

Similar numbers of reference refer to similar parts throughout the several views.

Referring in detail to the drawing, there is shown in Figs. 1 to 7 inclusive a screw 10 having a shouldered point 11 at one end and a head 12 at the opposite end thereof. Along the screw 10 is placed a nut 13 into which the screw 10 is threaded, and between the nut 13 and the head 12 is placed a slidable head 14 through which the screw 10 may freely slide. The head 14 is provided with a slot 15 adapted to receive the adjusting nut 16 which is placed on the screw 10 between the heads 12 and 14.

Hinged to the nut 13 and head 14 are the arms 17 to the outer ends of which are pivotally attached the longitudinal bars 18 by means of the bolts 19. Each bar 18 is provided at one end with a jaw 20 and at its opposite end with the jaw 21, the former being inturned and the latter outturned.

The purpose of the two different types of jaws is to accommodate the device to different classes of work, it being necessary to reverse the position of the bars 18 when bringing opposite jaws 20 or 21 into a working position.

The operation of the device is as follows: Assuming the parts to be placed in the position shown in Fig. 1, the jaws 20 are placed behind the gear 22 and the nut 16 is moved to the desired position, after which the screw 10 is rotated to bring its point 11 into engagement with the countersink in the shaft 23. The screw 10 is then tightened by means of a wrench applied to the head 12 and then tapped with a hammer, the net result being that the blows imparted to the screw 10 flow in two directions, one directly against the end of the shaft 23 and the other around to the rear side of the gear 22, bringing about a rapid removal of the gear. It must be understood that the nut 16 need not be adjusted at each operation but only positioned to secure the correct angularity for the jaws 20 to accommodate itself for a given class of work. Obviously, anything falling within this range would require no further adjustment of the nut 16.

In the form of the device shown in Fig. 8 a tubular form of nut 24 is employed and it is provided with a plurality of radial ribs 25 containing the holes 26 through which are passed the bolts 27. By means of the rivets 19—A the arms 17 are attached to their respective bars 18. The nut 24 is threaded along its entire length, and this is in effect the simple union of the members 13 and 14, in which event the adjusting nut 16 is not required.

In order to provide an angular adjustment for the bars 18 a number of holes 26 may be formed in the ribs 25, into any one of which the bolts 27 may be placed.

It will be understood that the particular types of jaws 21 and 22 may be varied at will without departing from the spirit of this invention. Also any number of bars 18 may be employed, for example three as shown in Fig. 8, or more as may be deemed advisable.

The outstanding advantage of this device over others resides in the fact that the forces of the blows directed against the head 12 are exerted from opposite sides against the shaft 23 and its gear 22, thereby bringing out a rapid removal of the gear.

It will also be noted that regardless of the diameter of the gear 22 the jaws 20 will always engage the face thereof to the best advantage and occupy a position which will provide the maximum amount of pulling action with the least amount of strain on the members 18.

It is desirable to provide an intermediate hole 28 in the bars 18 and the ribs 25 to permit those arms 17 which are nearest to the jaw which is engaging the gear 22 to be moved further away therefrom to provide the necessary amount of clearance between the gear 22 and the arms 17, which is sometimes necessary where the gears 22 are of unusual width or bearings are incorporated in the gear itself.

I claim:

A gear puller including a screw having a work-engaging point at one end and a driving head at the other end, a lock nut on said screw adjacent to its driving head, a threaded nut on said screw between said lock nut and the pointed end of the screw, a sliding head on said screw between the threaded nut and the lock nut, said sliding head having a slot formed across one end thereof adapted to engage the flat sides of said lock nut, longitudinal bars disposed alongside of said screw having work-engaging claws formed thereon, links hinged at one end to said claw bars and hinged at the other end to said sliding head, and a second set of links also hinged to said claw bars and having the opposite ends thereof hinged to said threaded nut, the distance between said sliding head and threaded nut determining the angularity of the claws with relation to the work.

JOSEPH F. GUNDERSON.